(12) United States Patent
Alvarado

(10) Patent No.: US 8,174,409 B2
(45) Date of Patent: May 8, 2012

(54) LINEOGRAPHIC ALPHANUMERIC DATA INPUT SYSTEM

(76) Inventor: Alfredo Alvarado, Weston, FL (US)

(*) Notice: Subject to any disclaimer, the term of this patent is extended or adjusted under 35 U.S.C. 154(b) by 935 days.

(21) Appl. No.: 11/901,152

(22) Filed: Sep. 13, 2007

(65) Prior Publication Data

US 2009/0073002 A1    Mar. 19, 2009

(51) Int. Cl.
*H03M 11/00*    (2006.01)
*G09G 5/00*    (2006.01)

(52) U.S. Cl. .......................................... 341/22; 345/156
(58) Field of Classification Search .............. 341/20–35; 345/156; 379/433.07
See application file for complete search history.

(56) References Cited

U.S. PATENT DOCUMENTS

| | | | | |
|---|---|---|---|---|
| 3,996,557 A * | 12/1976 | Donahey | ....................... | 382/186 |
| 5,486,823 A | 1/1996 | Tsai | | |
| 5,521,986 A * | 5/1996 | Curtin et al. | .................. | 382/187 |
| 5,982,303 A * | 11/1999 | Smith | ............... | 341/22 |
| 6,232,892 B1 | 5/2001 | Burrell, IV | | |
| 6,259,044 B1 * | 7/2001 | Paratore et al. | .............. | 200/5 A |
| 6,636,606 B1 * | 10/2003 | Lissner et al. | ................ | 379/451 |
| 6,735,307 B1 | 5/2004 | Volckers | | |
| 6,765,556 B2 | 7/2004 | Kandogan et al. | | |
| 6,885,318 B2 | 4/2005 | Bickerton | | |
| 6,925,315 B2 * | 8/2005 | Langford | ................... | 455/575.1 |
| 6,940,490 B1 * | 9/2005 | Kim et al. | ...................... | 345/168 |
| 6,941,125 B2 * | 9/2005 | Montague | .................. | 455/404.1 |
| 7,083,342 B2 * | 8/2006 | Griffin | ......................... | 400/485 |
| 7,098,896 B2 | 8/2006 | Kushler et al. | | |
| 7,126,498 B2 * | 10/2006 | Levy | ............................... | 341/22 |
| 2003/0025618 A1 * | 2/2003 | Burrell, IV | ..................... | 341/23 |
| 2004/0090448 A1 * | 5/2004 | Litwiller | ....................... | 345/702 |
| 2004/0120583 A1 * | 6/2004 | Zhai | ............................ | 382/229 |
| 2005/0025551 A1 * | 2/2005 | Katz | ............................ | 400/472 |
| 2006/0066583 A1 | 3/2006 | Toutonghi et al. | | |
| 2006/0103623 A1 | 5/2006 | Davis | | |
| 2006/0116135 A1 | 6/2006 | Ure | | |

* cited by examiner

*Primary Examiner* — Daniel Wu
*Assistant Examiner* — John Bamert
(74) *Attorney, Agent, or Firm* — Mark D. Brown, Esq.; Malin Haley DiMaggio Bowen & Lhota, P.A.

(57) ABSTRACT

An alphanumeric data input system for entering text into portable electronic devices by making linear traces or taps with a thumb or finger on a touch sensitive lineographic keypad. This keypad is conveniently located on the upper and left part of the electronic device in order to facilitate the natural motion of the thumb thus avoiding fatigue and strain of the same. The system allows the user to enter operational commands on the keypad, as well as entering of letters of different alphabets such as the Latin Alphabet, Mathematical Greek and Russian Alphabets and possibly of alphabets of other foreign languages including Japanese, Chinese and Korean. This system can be used for entering a combination of letters to speed up the writing process, and enables the entering of punctuation marks, typographical symbols and a wide range of mathematical symbols.

7 Claims, 20 Drawing Sheets

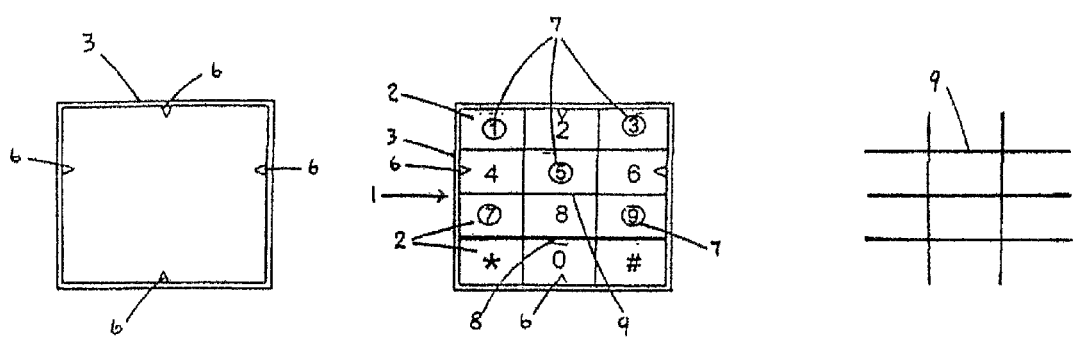
Fig. 2
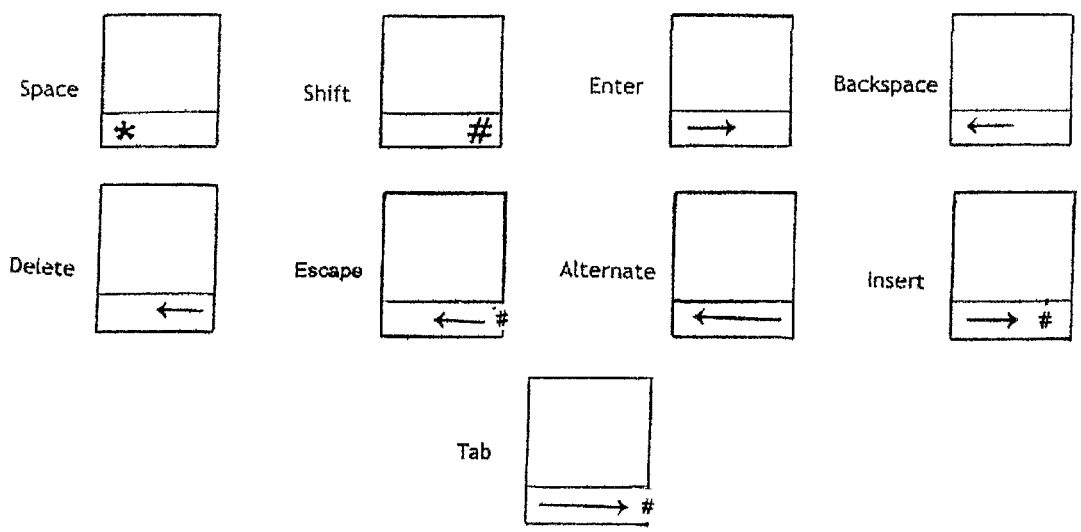
Fig. 3 Command Keys

Fig. 4  Alphabet

*Fig. 5*    Greek Alphabet

Fig. 6  Russian Alphabet

Fig. 7 Combined Letters

Fig. 8 Punctuation Marks

𝔉ig. 9     Typographic Symbols

Fig. 10A  Binary Operation Symbols

Fig. 10B  Binary Operation Symbols

Fig. 11A  Relation Symbols

Fig. 11B  Relation Symbols

| Symbol | Name |
|---|---|
| ⊏ | \sqsubset$^b$ |
| ⊐ | \sqsupset$^b$ |
| ≠ | \neq |
| ⌣ | \smile |
| ⊑ | \sqsubseteq |
| ⊒ | \sqsupseteq |
| ≐ | \doteq |
| ⌢ | \frown |
| ∈ | \in |
| ∋ | \ni |
| ∝ | \propto |
| = | equal |
| ⊢ | \vdash |
| ⊣ | \dashv |
| < | lt |
| > | gt |
| : | colon |
| ∽ | \backsim |
| ≬ | \between |
| ⋔ | \pitchfork |
| ≎ | \bumpeq |
| ≏ | \Bumpeq |
| ∴ | therefore |
| ∵ | because |

Fig. 12  Arrow Symbols

Fig. 13A  Miscellaneous Symbols

Fig. 13B Miscellaneous Symbols

Fig. 15  Delimiters

| Symbol | Name |
|---|---|
| ( | lpar |
| ) | rpar |
| ↑ | \uparrow |
| ⇑ | \Uparrow |
| [ | lsqb |
| ] | rsqb |
| ↓ | \downarrow |
| ⇓ | \Downarrow |
| { | lcub |
| } | rcub |
| ↕ | \updownarrow |
| ⇕ | \Updownarrow |
| ⌊ | \lfloor |
| ⌋ | \rfloor |
| ⌈ | \lceil |
| ⌉ | \rceil |
| ⟨ | \langle |
| ⟩ | \rangle |
| / | / |
| \ | \backslash |
| │ | \bracevert |
| ‖ | \vert |
| ⎱ | \rmoustache |
| ⎰ | \lmoustache |
| │ | \arrowvert |
| ‖ | \Arrowvert |
| ( | \lgroup |
| ) | \rgroup |

LINEOGRAPHIC ALPHANUMERIC DATA INPUT SYSTEM

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to a lineographic system for entering text into cellular phones, hand-held computers, and other electronic devices.

2. Description of Related Art

Currently many wireless electronic devices use a numeric pad such as the ones on the cellular phones, or a "QWERTY" style keyboard on hand-held devices for text entering. The term "QWERTY" (pronounced /kwerti/) is the most common modern-day keyboard layout on English-language computer and typewriter keyboards. It takes its name from the first six letters seen in the keyboard's top first row of letters. The QWERTY design was patented by Christopher Sholes in 1867 and sold to Remington in 1873, when it first appeared in typewriters. Conventional QWERTY keyboards, however, require space that is not sufficiently available on smaller electronic devices, such as cellular telephones, thereby limiting the user's ability to efficiently enter text and data.

Accordingly, advancements in the field of data input have led to the development of devices that employ virtual keyboards or handwriting recognizers. However none of these modalities is satisfactory because their use is awkward, time consuming and prone to error. Several U.S. patents address these problems trying to facilitate text entry into these devices. For example, U.S. Pat. No. 5,982,303 to Smith describes an alpha-numeric method using nine (9) numeric keys arranged radially around a center point. Each character is represented by a two stroke pictographic figure resembling the printed letter. However, the strokes required to form a letter are relatively large, and the entry of numbers requires two strokes which is very cumbersome. Besides this, there is no entry for key 5 on the telephone key pad rendering this key useless. In summary, this method is too complicated for a regular user.

Published U.S. Patent Application US 2006/0066583A1 to Toutonghi et al describes a method of precise text entry using a numeric key pad comprising numeric keys and non-numeric keys. This method requires a maximum of two key presses with a minimum of lateral movement of the user's finger across the pad. However this invention requires two separate mappings, one for lower case letters and another for upper case letters which is somewhat cumbersome.

Published U.S. Patent Application US 2006/0103623A1 to Davis discloses a method and apparatus to dial a telephone number that includes at least one numeric symbol and at least one non-numeric symbol. This invention includes a touch sensitive display screen. Essentially what this method does is to convert entered non-numeric symbols to corresponding numeric symbols and has nothing much to do with entering numbers for alpha-numeric text entry.

Published U.S. Patent Application US 2006/0116135A1 to Ure describes a morphology-based text entry system for touch typing on a telephone keypad by representing each letter as a combination of two separate symbols appearing on separate keys of a keypad. The keys may be operated by using the thumbs of both hands. Input may be accelerated by pressing multiple keys at the same time. The text entry system is applicable to a variety of languages and alphabets. The main problem with this system is that it is very complicated and very difficult to memorize.

U.S. Pat. No. 6,232,892 to Burrell IV relates to a twelve button telephone keypad for alphanumeric entry. The two-key alphabetic mode requires the pressing on two quite apart push buttons that are different for upper and lower case letters.

U.S. Pat. No. 6,735,307 to Voelkers provides a device and method for selecting text from an electronic memory using a numeric telephone keypad that has at least one pressure sensor. The respective pressure value is transmitted to and processed by control electronics.

U.S. Pat. No. 6,765,556 to Kandogan et al uses two keys on a standard phone layout to reproduce a letter. Each letter requires two taps or key inputs to type in letters without looking at the keys. Depressing only a single key is needed to enter numbers. This device is programmed to recognize two-key sequences at certain letters.

U.S. Pat. No. 5,486,823 to Tsai describes a keyboard system with small number of keys allowing a single hand input operation. According to the invention a keyboard is constituted by 15 keys, and 4-bit data is sent to keyboard controller.

U.S. Pat. No. 6,885,318 to Bickerton describes a method and device for improved character input wherein the method employs a telephone keypad comprising keys able to display secondary characters such as punctuation marks. The inventor claims that this method would be particularly useful for handheld devices such as mobile radio telephones or hand-held computers but the secondary characters are very limited in number.

U.S. Pat. No. 7,098,896 to Kushler et al describes a method and system of inputing alphabetic text having a virtual keyboard on a touch sensitive screen. This invention allows the writer to use the virtual keyboard, of a QWERTY layout, with a continuous contact of the touch sensitive screen. The user traces an input pattern for word by starting at or near the first letter in a decided word and then tracing through or near each letter in sequence. This invention generates a list of possible words associated with the entered part. This invention seems to be too complicated and very imprecise.

In summary, the current methods for entering text in cellular phones and other hand-held devices are difficult to operate due to the small size of the key buttons. The regular twelve button telephone keypad require up to four strokes which is very tedious and desperately slow. The handwriting recognizers are too slow and can not recognize most of the mathematical symbols.

Therefore, a good text entry system is needed to unleash the productivity of these hand held devices if we consider these remarkable statistics: More than a billion text messages a month! This is particularly surprising in view of the limited capability of the mobile key pads for text entry.

BRIEF SUMMARY OF THE INVENTION

The present invention overcomes the difficulties mentioned before by eliminating the regular telephone keypad and the small buttons arranged in conventional "QWERTY" configuration typically found on hand held devices. With this invention the process of entering text is made more efficient and more precise. The present invention thus provides a system for entering text into portable cellular phones, hand held computers, and other electronic devices in a precise form and with no room for ambiguity, by making linear traces or taps with a thumb or finger on a special lineographic keypad conveniently located on the upper and left part of the cellular phone or the hand held computer in order to facilitate the natural motion of the thumb thus avoiding fatigue and strain of the same. The system allows the user to enter operational commands on the keypad, as well as entering of letters of different alphabets such as the Latin Alphabet, Mathematical Greek and Russian Alphabets and possibly of alphabets of other foreign languages including Japanese, Chinese and Korean. The system can be used for entering a combination of letters to speed up the writing process, and enables the entering of punctuation marks, typographical symbols and a wide range of mathematical symbols.

The present invention describes a combination of a portable cellular phone with a hand held computer provided with a large screen that can rotate 90 degrees to facilitate reading of the text. The text entering system herein described is called "Lineographic" because it uses simple pictographic traces or lines that resembles, in certain way, the characters representing letters, numbers or symbols. Therefore the lineographic traces are easy to remember and to execute. The lineographic traces are executed with the thumb or fingers on a touch sensitive screen by moving them gently like a paintbrush stroke thus avoiding fatigue or strain, and if preferred with a brush or stylus. The short traces used for entering of letters are designed to minimize the displacement of the thumb or finger across the keypad. The letters are always written on the assigned alphanumeric area. The lineographic traces for commands, punctuation marks and symbols are always connected to the symbol-related area of the keypad. The digital numbers are entered by tapping gently on the corresponding cells.

During the tracing of letters or symbols there is no jumping of cells since the traces are always continuous with no gaps in between cells. Each character is precise with no room for ambiguity. The traces used to enter letters are very short and are made most of the time downwards and into the right to facilitate the natural motion of the thumb. The punctuation marks and symbols may require angulated traces that are always at right angles, the only exception being when using a combination of letters that requires different angles.

Accordingly, it is the object of the present invention to provide a system for text entering that can be used on hand held devices such as cellular phones and portable computers.

It is a further object of the invention to provide an alphanumeric keypad with twelve touch sensitive cells that can be used for text entering of letters, numbers, punctuation marks and mathematical symbols.

It is still a further object of the invention to provide a system that requires only one stroke on the keypad for each letter or punctuation marks, and one single tap for each number.

It is still a further object of the invention to provide a system that can encode a complete range of mathematical symbols.

It is a further object of the invention to provide a system for text entering that can use two or three letter combinations to form part of a syllable or word so the writing speed is significantly improved.

It is still a further object of the invention to provide a system that can use different alphabets such as Greek and Russian alphabets.

It is still a further object of the invention to provide a text entering system that can be used in different languages using their particular orthographic marks.

It is still a further object of the invention to provide a text entering system that is Romance language friendly but can be used with other European languages such as Swedish, Finnish, Hungarian and Czech.

It is still a further object of the invention to provide a text entering system that can be adapted to non-European languages such as Japanese, Chinese or Korean.

It is still a further object of the invention to provide a touch sensitive keypad that can be operated with one hand by using only the thumbs.

It is still a further object of the invention to provide a reduced size touch sensitive keypad that can be used blindly without looking at the keys.

Finally, it is a further object of the invention to provide a text entering device that is easy to fabricate and therefore very inexpensive.

These and other objects are met by the present invention which will become more apparent from the accompanying drawings and the following detailed description of the drawings and preferred embodiments.

BRIEF DESCRIPTION OF THE SEVERAL VIEWS OF THE DRAWINGS

FIG. 2 shows a lineographic keypad containing 12 touch sensitive cells encased in a high relief frame;

FIG. 15 shows the Delimiter Symbols used in mathematical expressions with their corresponding lineographic traces;

DETAILED DESCRIPTION OF THE INVENTION

Figure 1:
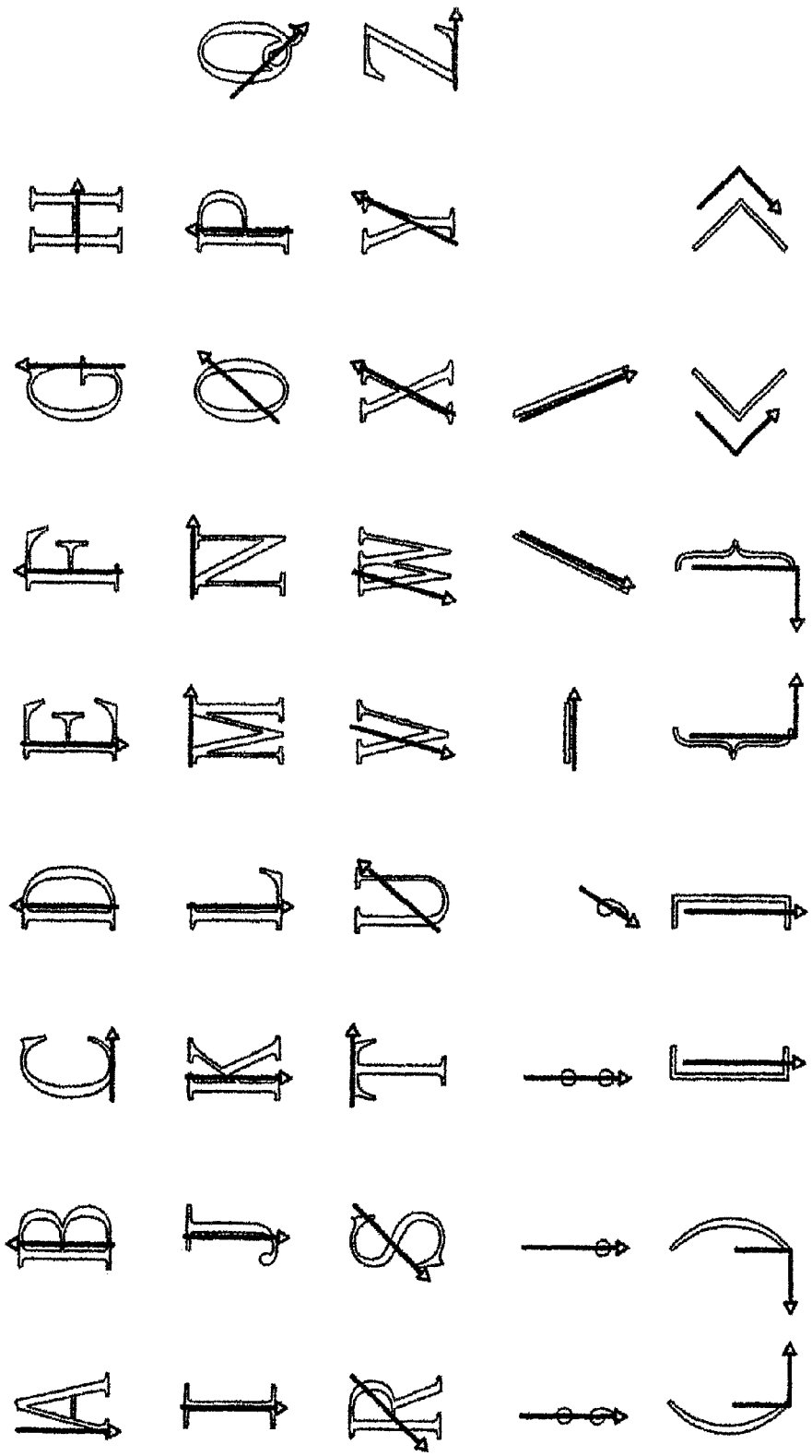
FIG. 1 shows the basic lineographic traces used to represent letters and a few punctuation marks.

FIG. 1 shows details of the lineographic traces used for entering letters and a few orthographic marks into a lineographic keypad. The traces resemble the represented characters and are assigned to a particular location on the keypad so they are always invariable and precise. For instance the punctuation marks are always connected to the symbol-related area and some of them resemble the represented character.

FIG. 2 shows a lineographic keypad 1 containing 12 touch sensitive cells 2 encased in a high relief frame 3. The first three rows constitute the alphanumeric area 4 which is assigned for entering letters and numbers only. The last three cells at the bottom of the keypad represent the symbol-related area 5 which is used for entering commands, symbols and marks. The lineographic keypad is provided with certain landmarks to facilitate the location of each of one of the 12 cells. The frame 3 around the keypad contains four small triangular protuberances 6 attached to the frame to indicate the position of the finger or the thumb within the keypad. There is also a light high relief circle 7 on the odd key numbers 1, 3, 5, 7 and 9, to distinguish these cells just by touching them. The symbol-related area 5 is separated from the alphanumeric area by a light high relief horizontal line 8 that can be felt on touch with the finger or thumb. The lineographic keypad is provided with a touch sensitive grid 9 that separates the touch sensitive cells so there is an extra-signal when making a trace on two adjacent cells.

For instance, the letter A involves the cells 1 and 4 plus the grid signal G ending up as 1G4. The letter C involves cells 7 and 8 plus the grid signal G so the complete signal would be 7G8. The complete signal for the letter O is 7G5, for letter R 2G4, for letter M, 2G3, for letter X, 5G3 and so on. Double letters can be traced with a continuous motion by reversing the traces, so double M would generate signal 2G3G2. Double S would generate signal 3G5G3; double T, signal 0G2G0, etc. Even triple letters like WWW would be traced by making a second reversal of the trace so the final signal would be 5G7G5G7. Obviously when writing these traces there is no need to memorize the signals since the lineographic system is essentially a simplified pictographic device represented by short lines. Said touch sensitive cells and grid are interfaced with an electronic circuitry such as a microprocessor (not shown here).

Figure 3:
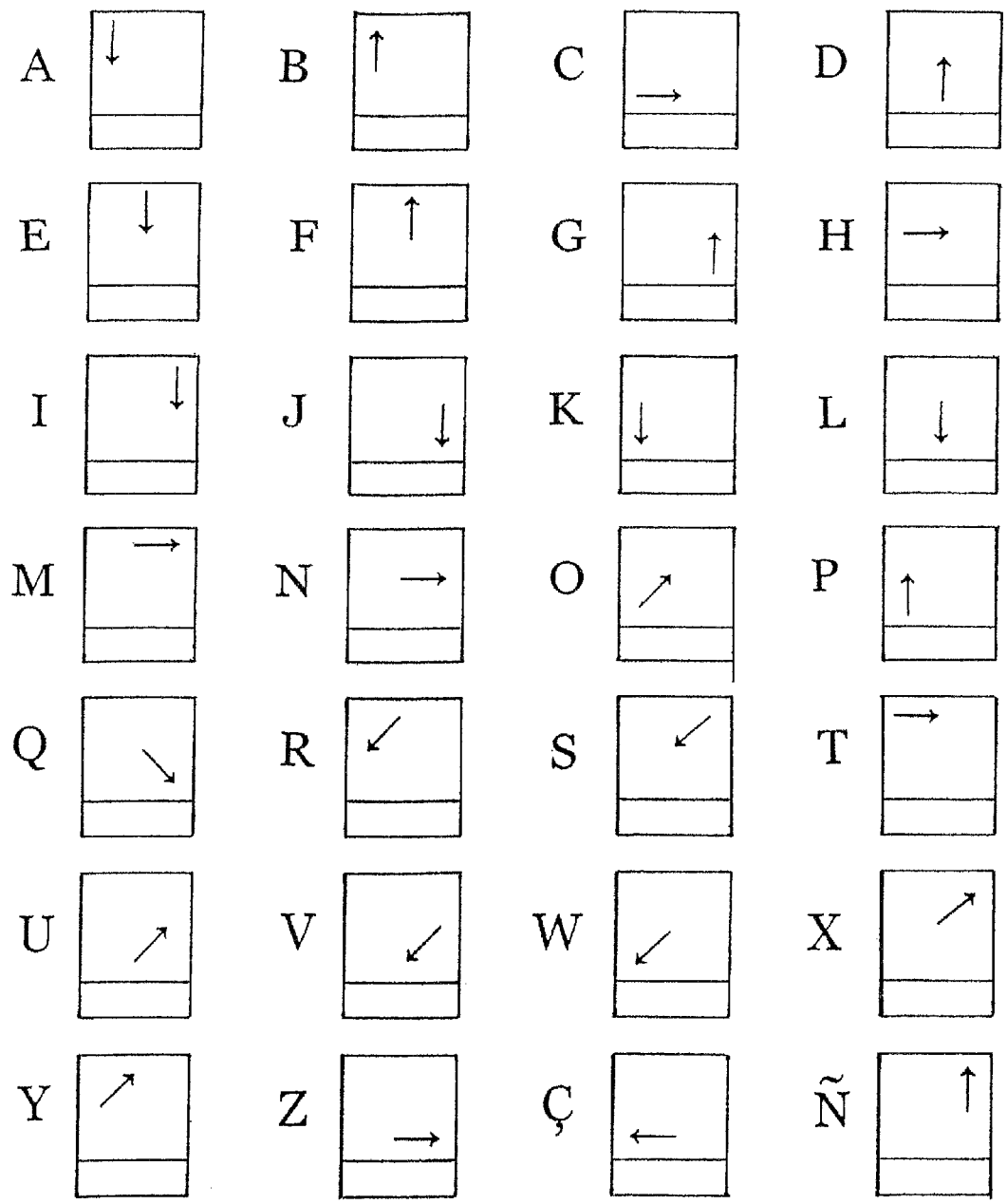
FIG. 3 shows the numbers and command keys on the touch sensitive keypad.

FIG. 3 illustrates the operational Command Keys used on the lineograpic pad. They include Asterisk key to put a space and Number Key for capital shift or capital lock. Enter is obtained by making a short trace on the keys * and 0, Backspace is obtained by making a reverse short trace on the same keys, and Delete is obtained by making a short trace on the keys # and 0.

Figure 4:
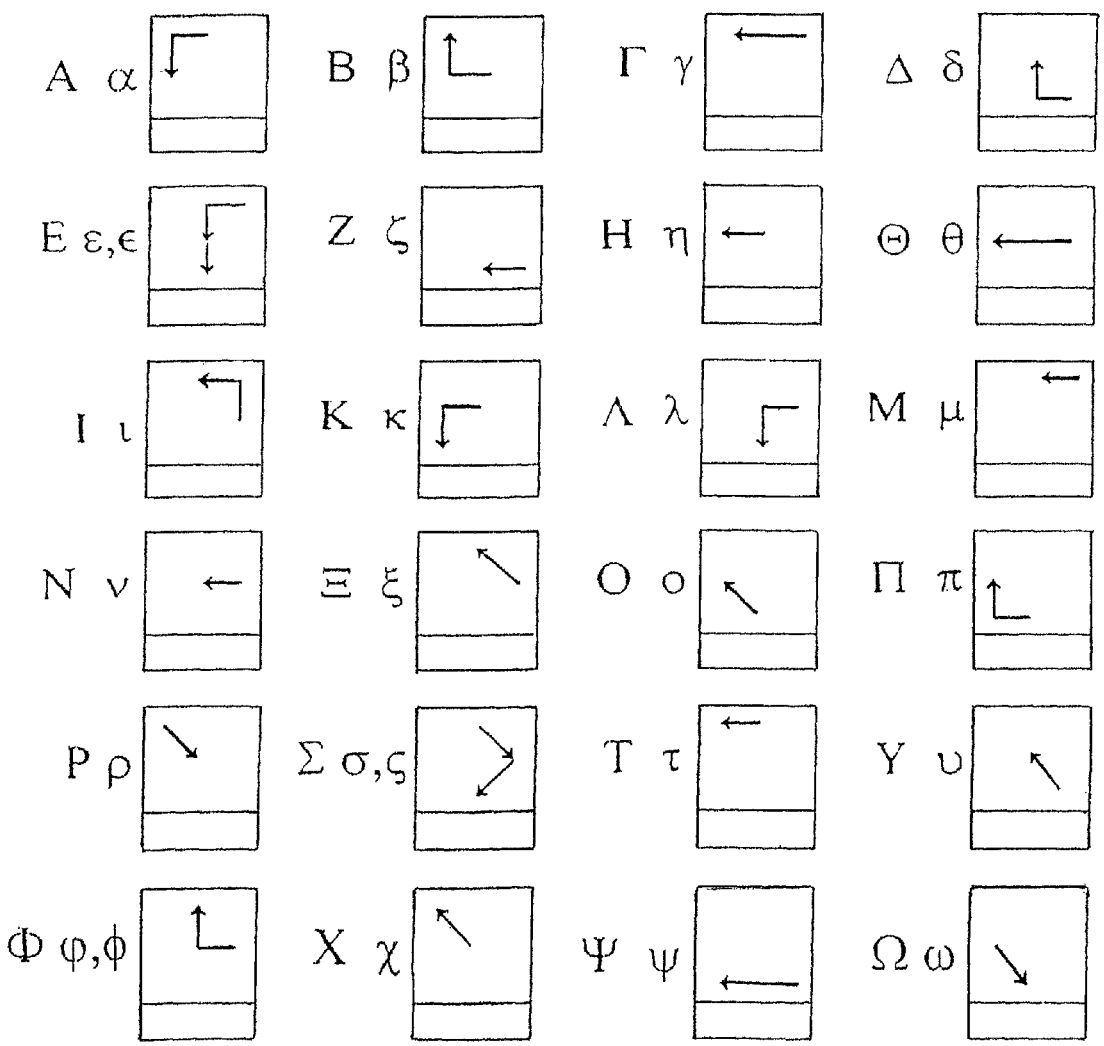
FIG. 4 shows the Latin Alphabet with the corresponding lineographic traces.

FIG. 4 illustrates different short traces to enter letters of the Latin Alphabet that includes the letters C with a cedilla and the Spanish N with a tilde. Note that all the alphabetic traces are entered on the alphanumeric area only.

Figure 5:
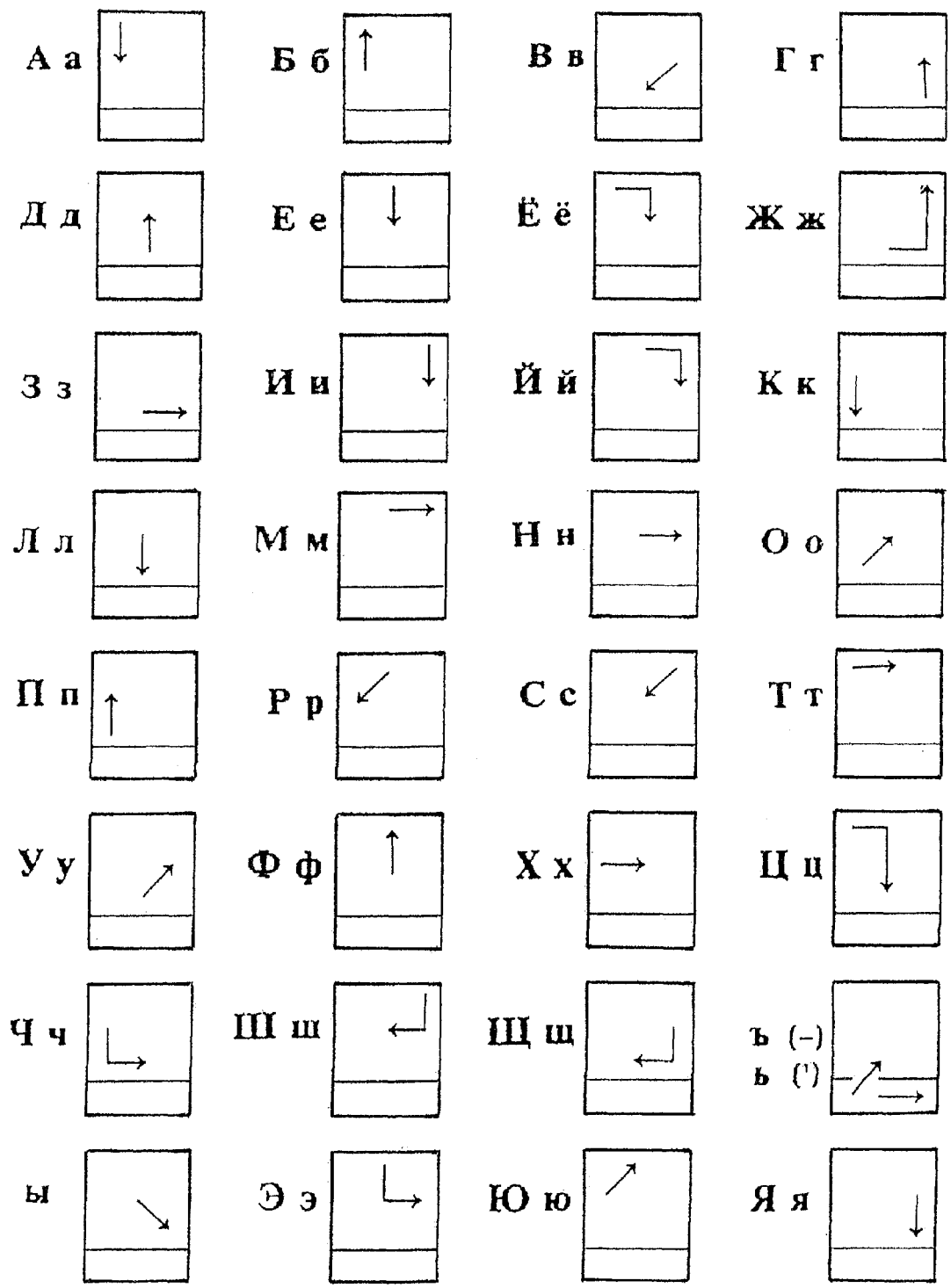
FIG. 5 shows the Greek Alphabet with the corresponding lineographic traces that can be used along with the Latin Alphabet when needed in mathematical expressions.

FIG. 5 illustrates the traces of the Mathematic Greek Alphabet that can be used concurrently with the Latin Alphabet. Note that the letters Epsilon and Sigma have certain variants that are used in mathematical expressions so they are represented here by an extension to the original letter. Mathematical Greek uses the TeX rendering which is in line with the convention that variables should be italicized.

Figure 6:
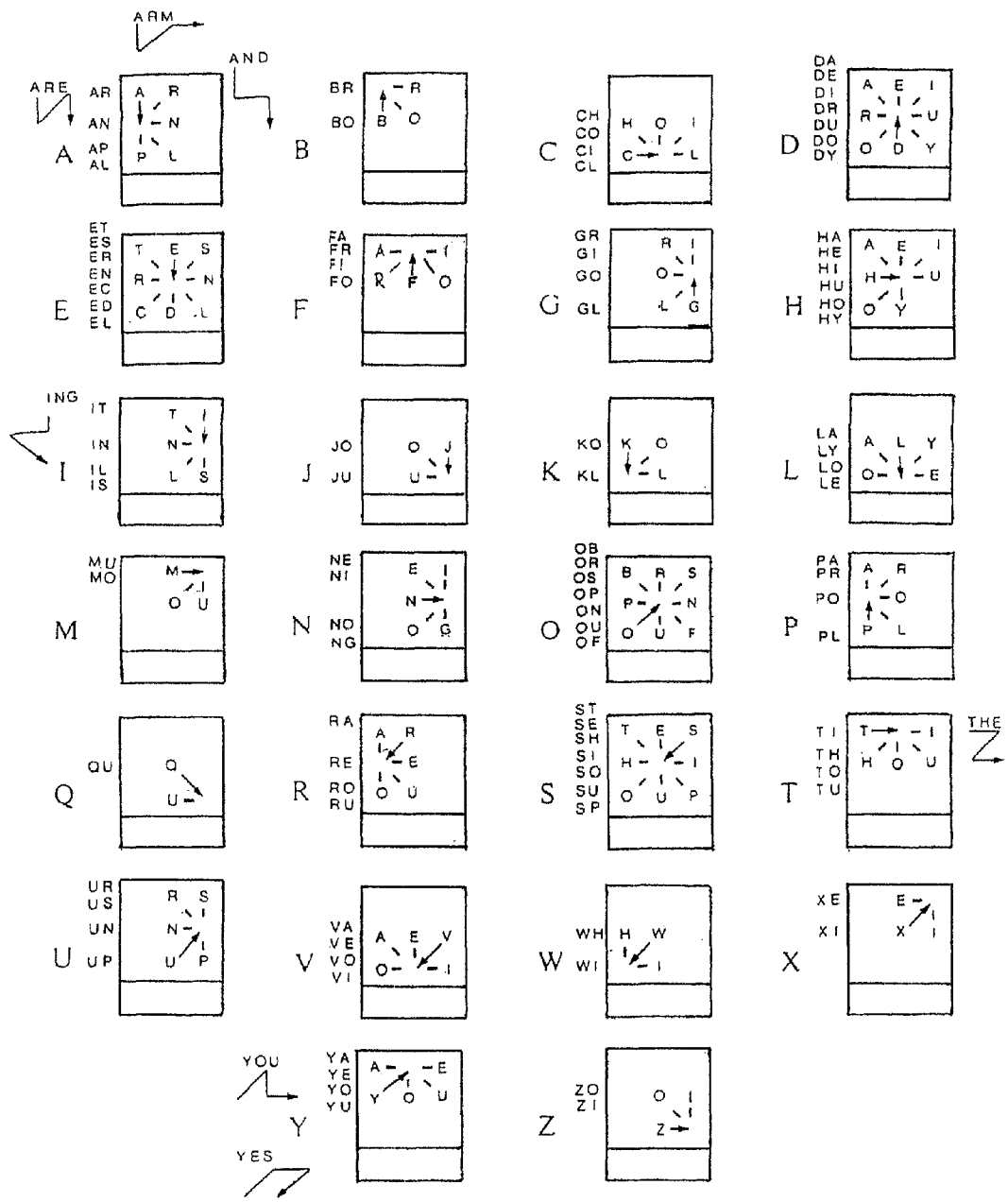
FIG. 6 shows the Russian Alphabet adapted to the lineographic system as an example to demonstrate the possibility of using the lineographic system in different languages.

FIG. 6 illustrates the traces used to represent the letters of the Russian Alphabet. These characters are a demonstration that the lineographic system can be adapted to other foreign alphabets such as Polish, Czech, Hungarian, Turkish, etc, and perhaps to oriental languages such as Japanese, Chinese or Korean.

Figure 7:
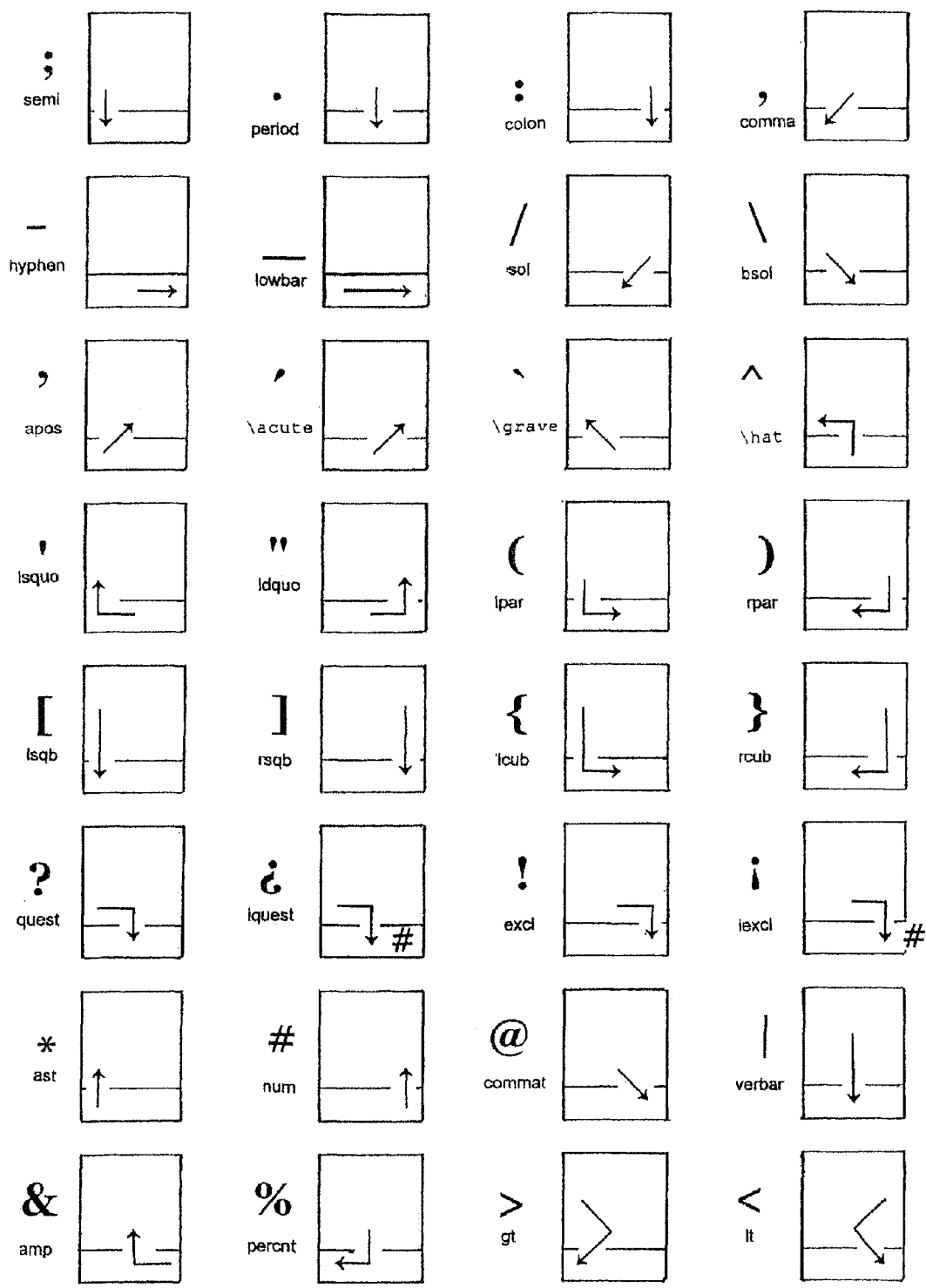
FIG. 7 shows a combination of letters that can be used for speeding up writing on the lineographic keypad.

FIG. 7 illustrates a combination of letters obtained by extending the original trace of a particular letter to adjacent letters to form a syllable or word in order to speed up the writing. For instance, to write the word AN the writer makes a short down trace corresponding to the letter A which is continued to the center near the letter N. The word ARE is traced by making a down stroke for the letter A, followed in continuity with a stroke directed to the letter R and a down stroke for the letter E. The article THE is traced by making a horizontal trace for the letter T, followed by an oblique stroke toward the letter H and a horizontal stroke toward the letter E. There are many useful combinations especially for the letters E, D, H, O and S.

Figure 8:
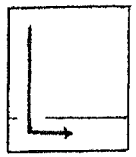
FIG. 8 shows the basic punctuation marks with their corresponding lineographic traces.

FIG. 8 illustrates the different traces used to enter common punctuation marks. Note that these marks are always connected to the symbol-related area. Certain marks used in the Spanish Language, such as the reversed question and exclamation marks, are included here, and also certain marks for accents in foreign languages.

Figure 9:
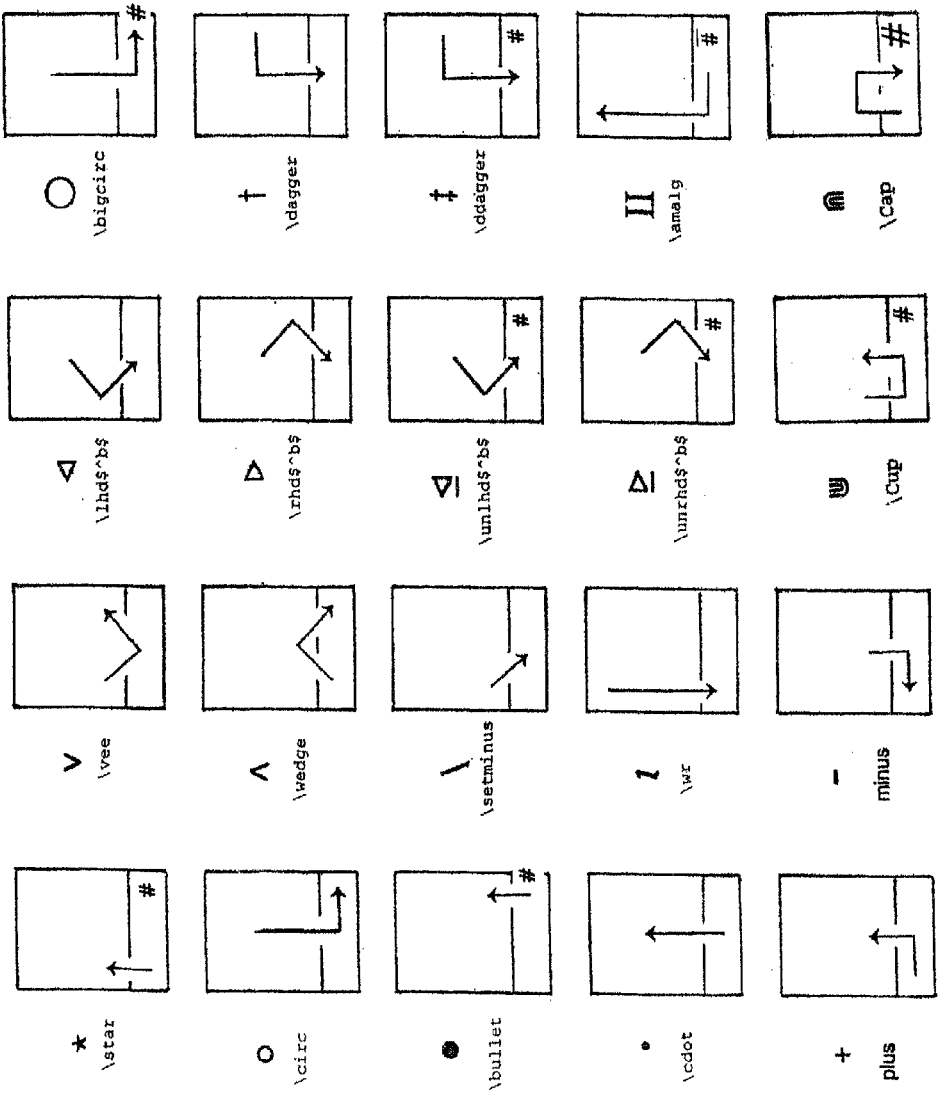
FIG. 9 shows the most common typographical symbols using the lineographic system.

FIG. 9 illustrates the traces used for different Typographic Symbols that are always connected to the symbol-related area.

Figure 10:
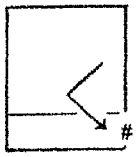
FIG. 10A shows the Binary Operation Symbols used in mathematic expressions with their corresponding lineographic traces.
FIG. 10B is a continuation of the Binary Operation Symbols using the Lineographic system.
Figure 11:
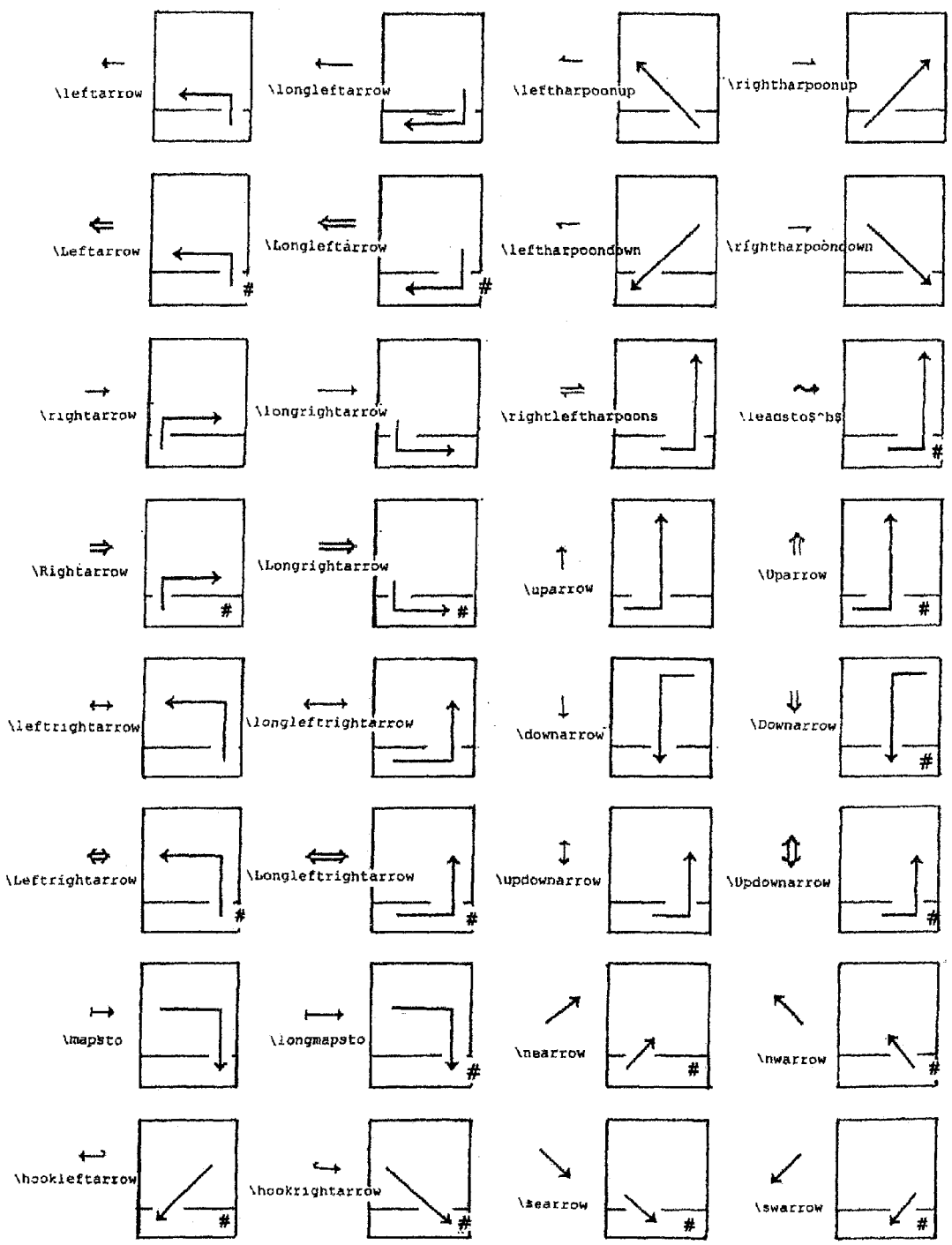
FIG. 11A shows the Relation Symbols used in mathematical expressions with their corresponding lineographic traces.
FIG. 11B is a continuation of the Relation Symbols with their lineographic traces.
Figure 12:
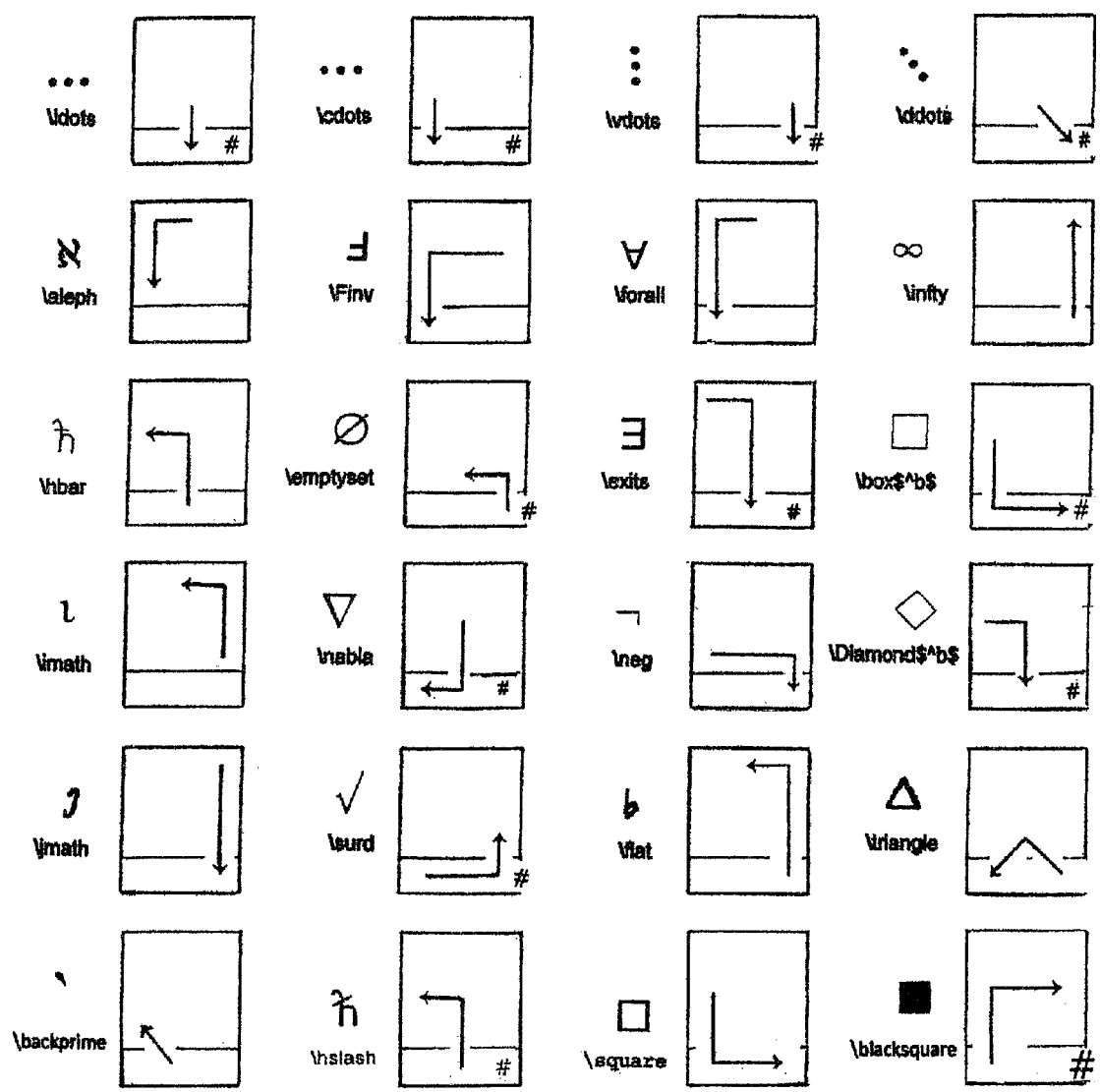
FIG. 12 shows the Arrow Symbols with their corresponding lineographic traces used in mathematic expressions.
Figure 13:
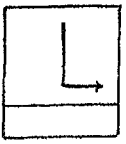
FIG. 13A shows the Miscellaneous Symbols used in mathematical expressions with their corresponding lineographic traces.
FIG. 13B is a continuation of the Miscellaneous Symbols with their linographic traces.
Figure 14:
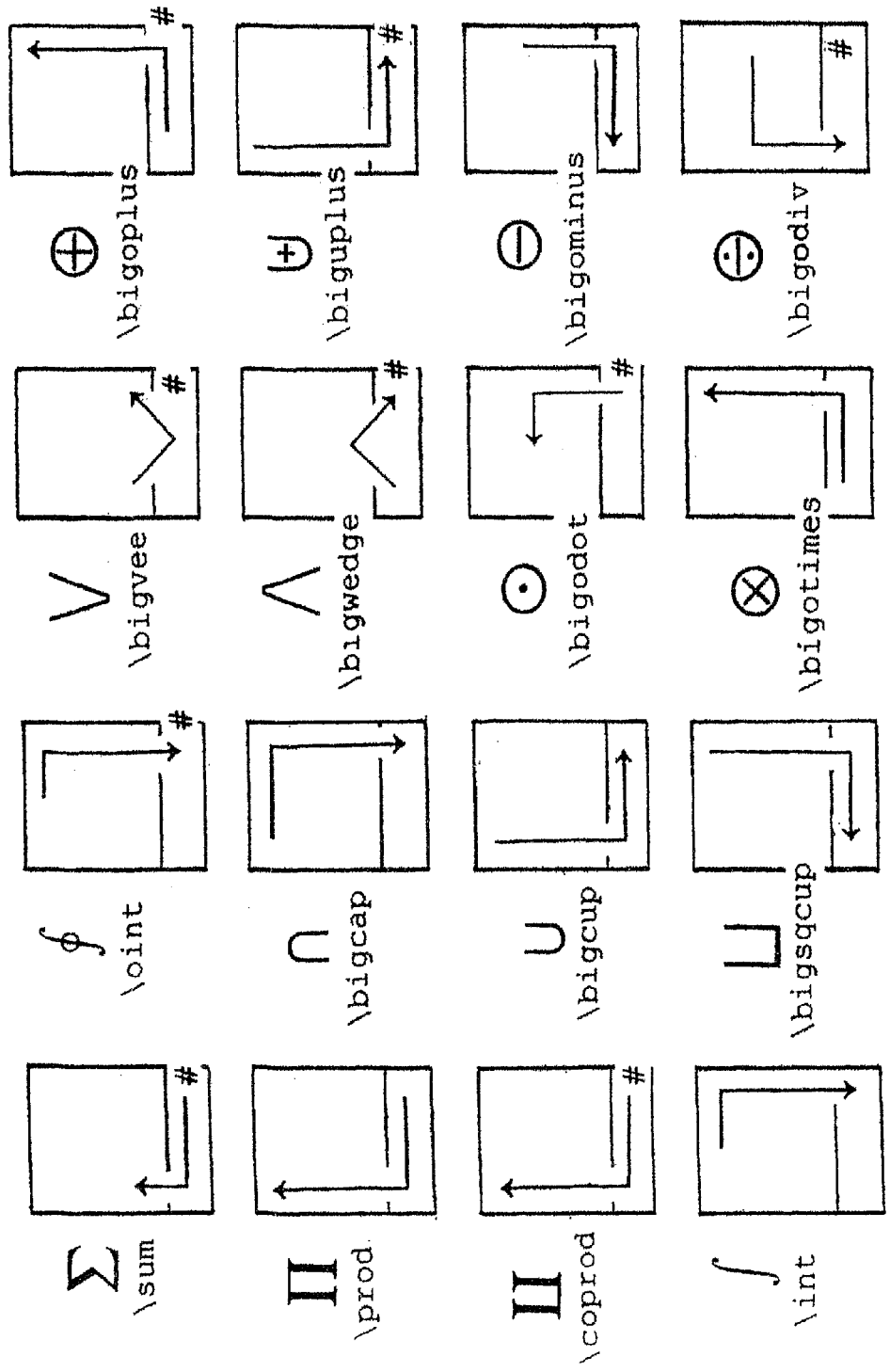
FIG. 14 shows the Big Size Symbols used in mathematical expressions with their corresponding lineographic traces.

FIG. 10A illustrate the lineographic traces used in mathematical expressions to enter Binary Operational Symbols. Note that all the symbols are always connected to the symbol related area of the lineographic keypad. FIG. 10B illustrates more traces used for entering Binary Operational Symbols. FIG. 11A illustrates the lineogrphic traces used for entering Relation Symbols in mathematical expressions. FIG. 11B illustrates a continuation of the Relation Symbols. FIG. 12 illustrates the lineographic traces used for a variety of Arrow Symbols in mathematical expressions. FIG. 13A illustrates the lineographic traces used for entering Miscellaneous Symbols in mathematical expressions. FIG. 13B is a continuation of the traces used for entering Miscellaneous Symbols in mathematical expressions. FIG. 14 illustrates the lineographic traces used for entering Big Size Symbols in mathematical expressions. FIG. 15 illustrates the lineographic traces used for entering Delimiters in mathematical expressions.

Figure 16:
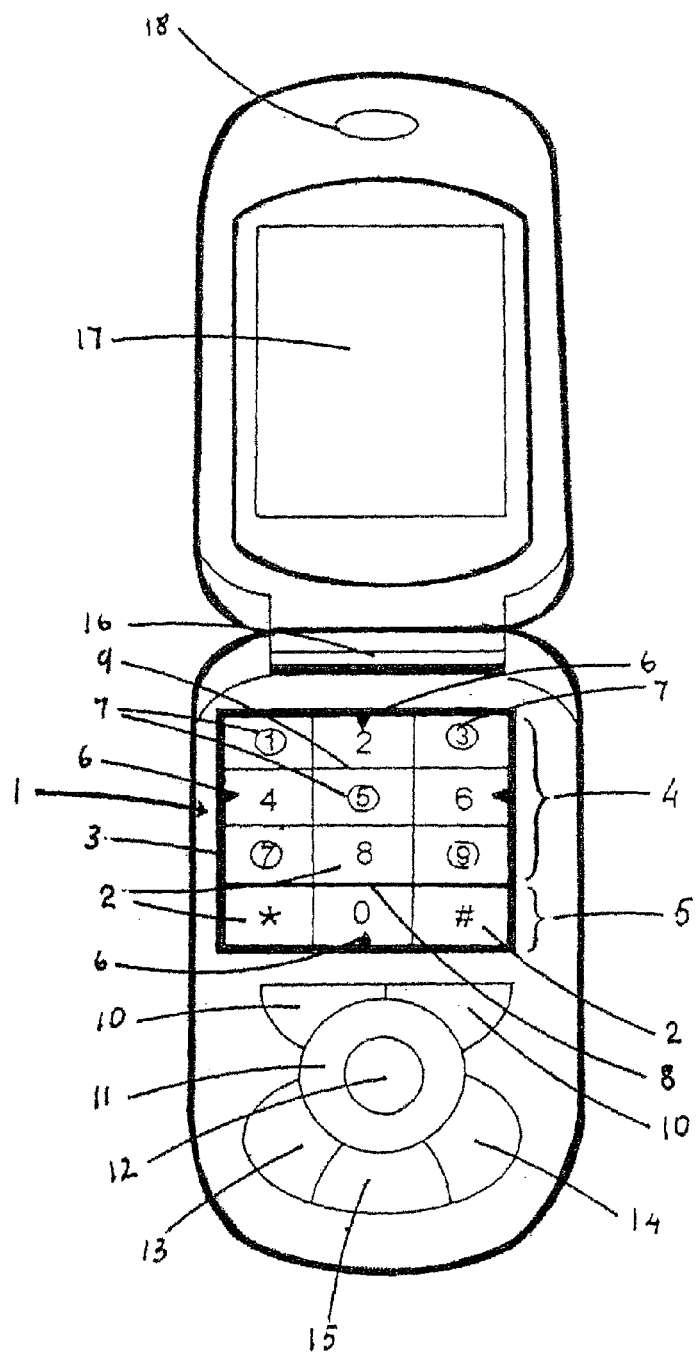
FIG. 16 shows a regular portable cellular telephone provided with a lineographic keypad located at its upper and left part.

FIG. 16 shows the drawing of a prototype cellular phone provided with a writing keypad 1 containing twelve touch sensitive cells 2 separated by a touch sensitive grid 9. This writing pad is located at the upper and left portion of the phone in order to facilitate the movement of the thumb thus avoiding strain and fatigue when writing. The writing pad is encased in a high relief frame 3 to keep the thumb or finger inside the frame and it has four landmarks in the form of small triangular protuberances 6 to indicate the general position of the touch sensitive cells. The cells with an odd number are marked with a light high relief circle 7. There is a light high relief division line 8 separating the alphanumeric area from the symbol-related area. The drawing shows also several regular keys at the lower part of the phone for different functions such as the left and right functional keys 10, the navigation key 11, confirm key 12, send key 13, end key 14, and clear key 15. The phone appears in the open position and shows a hinge 16, a screen or display 17, and an ear piece 26.

Figure 17A:
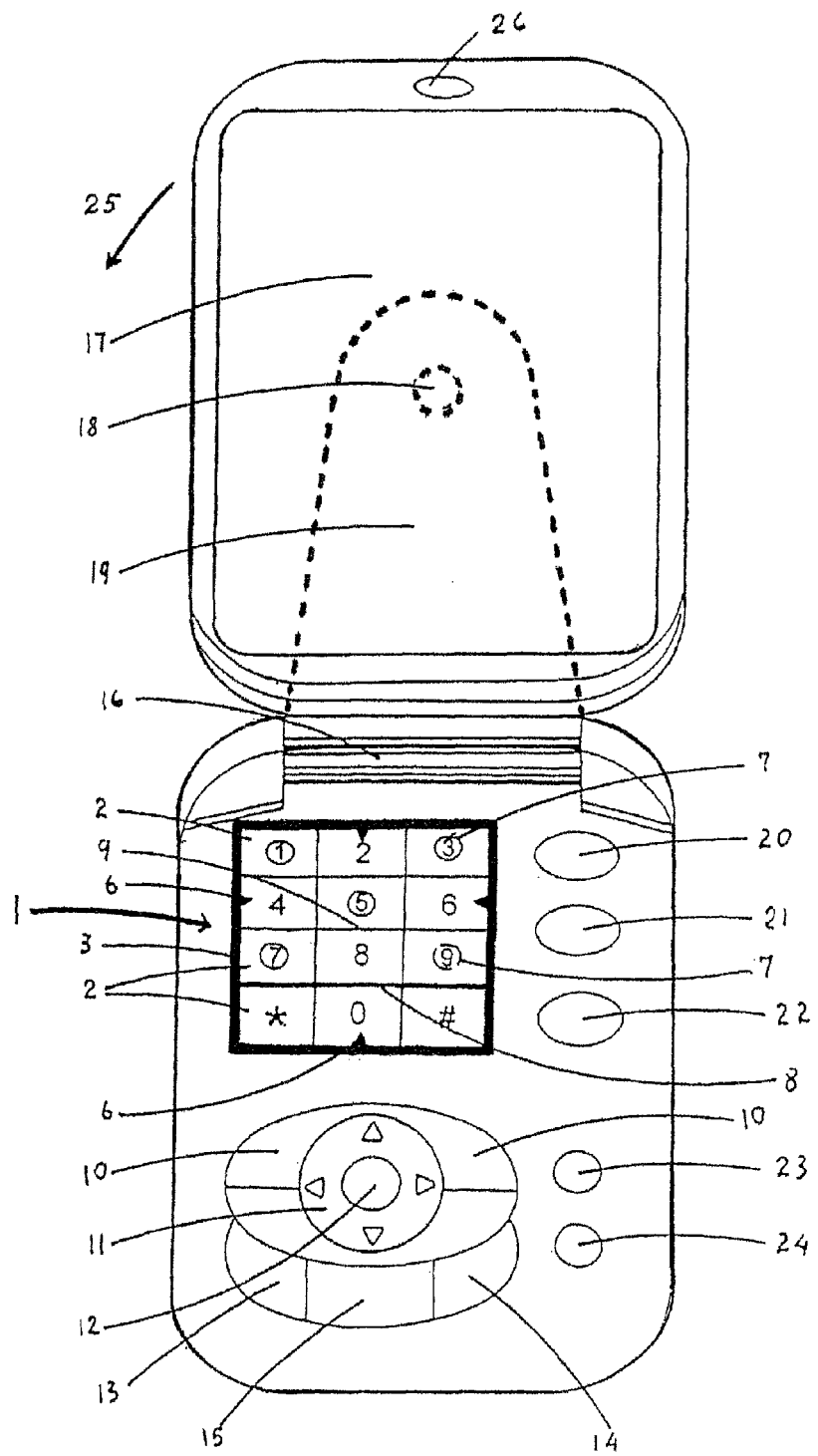
FIG. 17A shows a prototype hand held device provided with a large screen and a lineogrphic key-pad located at the upper and left part.

FIG. 17A shows the drawing of a cellular phone combined with a hand held computer in an open position. The writing keypad 1 is located at the upper and left portion of the phone in order to facilitate the movement of the thumb and to avoid fatigue and strain. The keypad is encased by a high relief frame 3 which is provided with four land marks 6. There is twelve touch sensitive cells 2 encased inside the frame 3, and separated by a touch sensitive grid 9. The cells with an odd number are marked with a light high relief circle 7. There is a light high relief division line 8 separating the alphanumeric area from de symbol related area. The hand held computer is also provided with buttons for Alternate 20, Control 21, and Delete 22 functions. There is also two buttons for using the computer in the Text mode 23 or in the Phone mode 24.

Figure 17B:
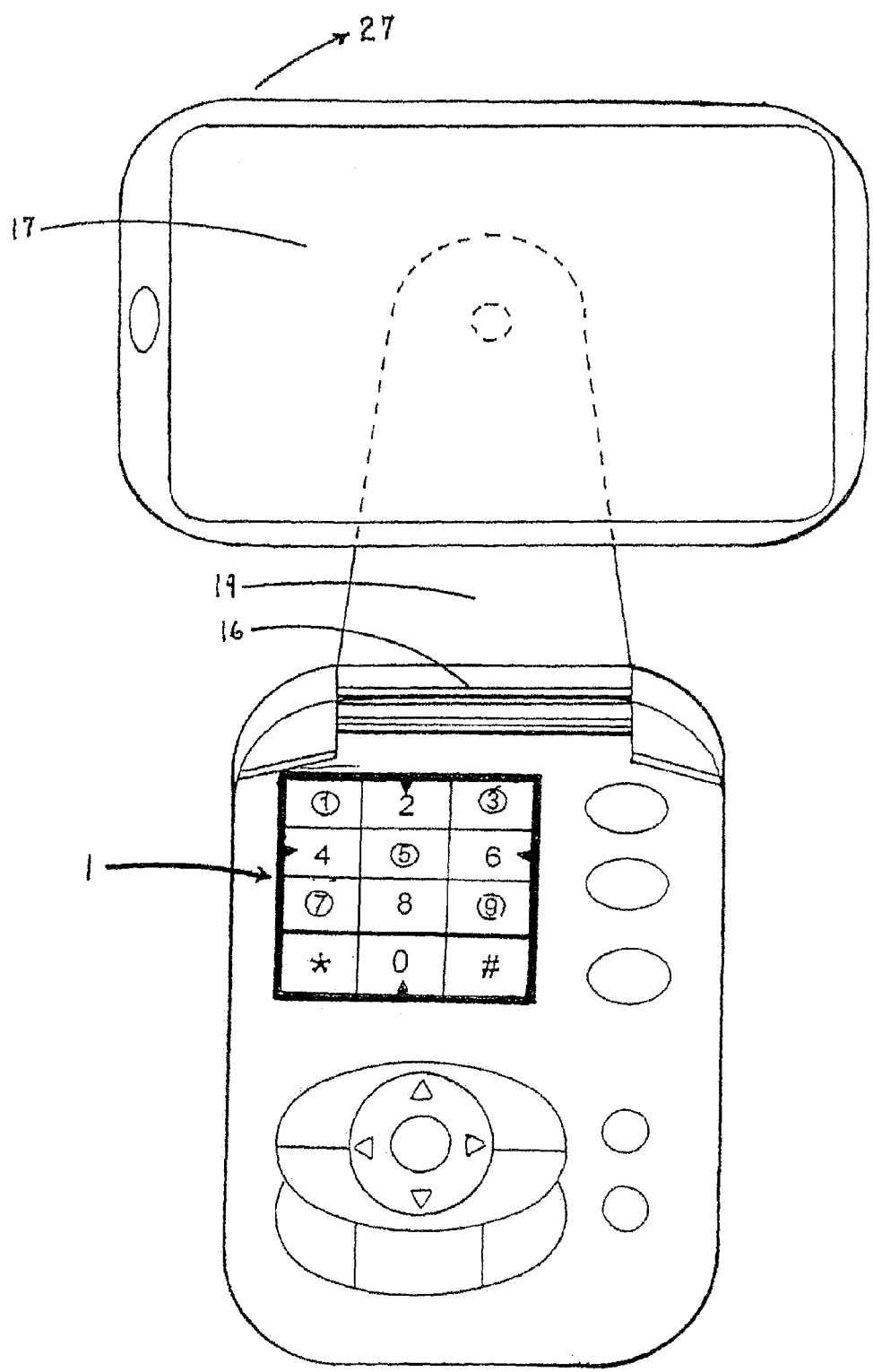
FIG. 17B shows the same prototype with the large screen displayed in a T-configuration for easy reading.

As in the cellular phone there is also several regular keys at the lower part of the hand held computer for different functions such as the left and right functional keys 10, the navigational key 11, confirm key 12, send key 13, end key 14, and clear key 15. The large screen 17, in an up right position, can rotate on axis 18 into a horizontal position following the circular arrow 25. There is a support piece 19 on the back of the screen 17 attached to hinge 16. There is an earpiece 26 at upper end of the screen 17. FIG. 17B shows a hand held computer with the screen 17 rotated into a horizontal position for easy reading. Herein it shows part of the support piece 19 attached to hinge 16. The screen 17 can be reversed into a vertical position following the circular arrow 27 to allow the screen to be folded down. The remaining features of the writing keypad 1 and telephone functions remain the same as in the FIG. 17A.

Method of Use

The lineographic system herein described is very easy to operate since it requires the use of one thumb or finger to make short traces or taps on a touch sensitive keypad. The traces of the regular alphabetic letters and punctuation marks can be memorized in a very short time, an even can be entered into the keypad without looking at the keys. Also the numbers are entered by tapping on them without looking at the keys because the keypad has certain landmarks to be sure that the numbers are entered correctly. Space is produced by tapping on the Star key. The upper case letters can be entered by tapping once on the Capital Shift key (# key), and Capital Lock is secured by tapping twice on the same key. Both Capital Shift and Capital Lock are inactivated by tapping once on the same key.

Operation commands are produced by tapping sequentially on two different keys and these include Delete (# key+0), Insert (# key+5), Home (# key+1), Arrow Up (# key+2), Page Up (# key+3), Arrow Left (# key+4), Arrow Right (# key+6), End (# key+7), Arrow Down ((# key+8), Page Down (# key+9), and Control (# key+*key). Also for faster typing the operator can use the combination letters that can be learned very easily as illustrated in FIG. 7. The advanced punctuation and mathematical symbols can be mastered with some special dedication but they are not difficult to learn.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A lineographic data input system for allowing a user to enter alphanumeric characters, numbers, and symbols into an electronic device, said lineographic input system comprising:
   a keypad bordered by a raised frame, said keypad consisting of 12 touch sensitive cells and a touch sensitive grid separating said cells, each of said cells and said grid adapted to generate an input signal when touched, whereby a user trace that touches a first one of said 12 touch sensitive cells and crosses over a portion of said grid to an adjacent second one of said 12 touch sensitive cells thereby generates a complete signal, said complete signal including signals corresponding to said first one of said cells, said second one of said cells, and said portion of the grid crossed;
   said keypad electrically connected to means for electronically processing said input signals from said keypad and corresponding said input signals with alphanumeric characters, numbers, and symbols;
   wherein each of the 26 letters of the alphabet correspond to a complete input signal formed by a single linear trace on said keypad, said linear trace touching only two adjacent cells and a portion of said grid;
   whereby data input may be entered into an electronic device by making short linear traces across the cells and grid thereby generating said input signals corresponding to alphanumeric characters, numbers, and symbols.

2. A lineographic data input system according to claim 1, further including four landmarks in the form of small triangular protuberances disposed in proximity to each side of said frame.

3. A lineographic data input system according to claim 1, wherein certain of said cells are adapted with light high relief circular marks corresponding to odd numbers.

4. A lineographic data input system according to claim 1, wherein said plurality of cells are configured in four rows and three columns.

5. A lineographic data input system according to claim 4, further including a high relief line separating the first three rows from the fourth row.

6. A lineographic data input system according to claim 4, wherein the first three rows comprise an alphanumeric area, and the fourth row comprises a symbol-related area.

7. An electronic device adapted with a lineographic data input system for allowing a user to enter alphanumeric characters, numbers, and symbols into the electronic device, said electronic device comprising:
   a keypad bordered by a four sided raised frame, said keypad including twelve touch sensitive cells and a touch sensitive grid separating said cells, said cells disposed in an array of four rows and three columns, each of said cells and said grid adapted to generate an input signal when touched by a user;
   four small protuberances disposed in proximity to each side of said frame for providing tactile reference points to aid the user in positioning of the finger or thumb;
   said grid including a raised portion separating the third and fourth rows;
   means, electrically connected to said keypad, for electronically processing input signals from said keypad and corresponding said input signals with alphanumeric characters, numbers, and symbols;

wherein each of the 26 letters of the alphabet correspond to a complete input signal formed by a single linear trace on said keypad that only touches a first one of said twelve touch sensitive cells and crosses over a portion of said grid to an adjacent second one of said twelve touch sensitive cells thereby generates a complete signal, said complete signal including signals corresponding to said first one of said cells, said second one of said cells, and said portion of the grid crossed, and wherein letter combinations are formed by continuous non-linear traces on said keypad;

whereby data input may be entered into an electronic device by making short linear traces across the cells and grid thereby generating said input signals corresponding to alphanumeric characters, numbers, and symbols.

* * * * *